Jan. 7, 1964 B. J. STRON 3,116,938
VEHICLE SUSPENSION ADAPTED TO IMPROVE STABILITY IN TURNS
Filed Feb. 13, 1962

INVENTOR

BORIS JOSEPH STRON

BY Irwin S. Thompson

ATTORNEY

United States Patent Office 3,116,938
Patented Jan. 7, 1964

3,116,938
VEHICLE SUSPENSION ADAPTED TO IMPROVE
STABILITY IN TURNS
Boris Joseph Stron, Cannes, France; Gurli Bodil Jensen
Stron, administratrix of said Boris Joseph Stron,
deceased
Filed Feb. 13, 1962, Ser. No. 172,915
Claims priority, application France Feb. 15, 1961
4 Claims. (Cl. 280—112)

My invention has for its object a suspension for power-driven vehicles, adapted to improve the stability and, in particular, to elastically oppose and reduce the transverse tilting of vehicles in turns and to reduce therefore such a tilting.

According to my invention, the chassis of the vehicle carries two symmetrical two-arm suspension levers pivotally secured to its sides, said levers being arranged transversely with reference to the longitudinal medial plane of the vehicle and being connected each through its outer arm with the corresponding axle on which it bears, said arms being obviously subjected to the action of springs resisting the action of the weight of the chassis. Furthermore, each suspension lever includes to either side of its pivotal connection with the chassis, two auxiliary pivots of which the outer pivot is further than the inner pivot from the medial plane of the vehicle while two transverse blade springs are fitted between the two suspension arms; one of the springs, say the left-hand spring, being pivotally secured to the outer pivot of the left-hand lever and to the inner pivot of the right-hand lever and conversely the other, right-hand spring being pivotally secured to the outer pivot of the right-hand lever and to the inner pivot of the left-hand lever and, lastly the chassis includes, on either side of the medial longitudinal plane, a stop engaging the corresponding blade spring. The distance separating, in each suspension lever, the two pivots from the pivotal axis of the connecting arm with the chassis should be suitably selected so that, when the vehicle has a tendency to tilt to one side, for instance towards the left-hand side, the pressure exerted by the left-hand stop on the chassis shifts the corresponding spring downwardly to a greater extent than the shifting by the right-hand stop by the corresponding spring and thereby the upwardly directed thrust of the spring is more considerable on the left-hand side than on the right-hand side, said difference opposing the tilting of the chassis.

Figure 1:
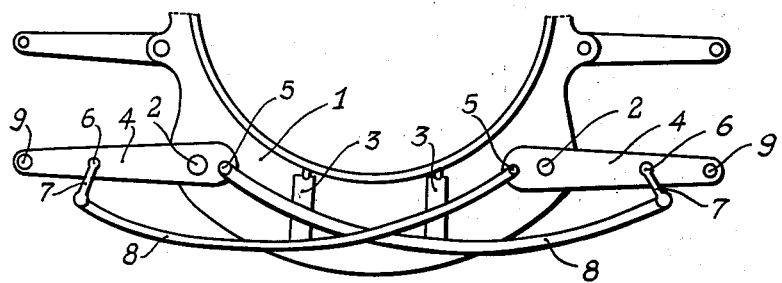
Figure 2:
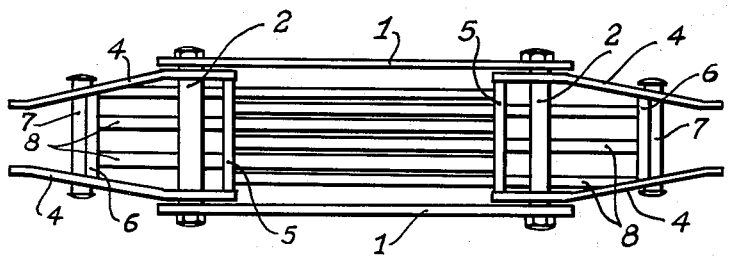

I have illustrated in the accompanying drawing, by way of example and in a diagrammatic manner, a preferred embodiment of my invention. In said drawing:

FIG. 1 is a front elevational view and
FIG. 2 is a plan view.

In said drawing, the chassis 1 is provided symmetrically, to the left-hand side and to the right-hand side, with pivotal axes carrying the suspension levers 4, the chassis including also stops 3 through which said chassis engages the springs to be described hereinafter.

The suspension levers 4 thus pivotally secured at 2 to the chassis are connected at their outer ends 9 through suitable means which are not illustrated, with the corresponding axle in a manner such that said ends of the arms remain at a constant height above ground. Each lever 4 carries to either side of its pivotal axis 2 through which it is connected with the chassis, two pivots 5 and 6. Two blade springs or groups of blade springs 8 are fitted between the levers. Each of said springs or groups of springs is pivotally connected, on the one hand, to the inner pivot 5 of one of the levers and, on the other hand, through a link or shackles 7 with the outer pivot 6 of the other lever, so that the two springs cross each other at a point in registry with their medial point, as clearly shown in FIG. 1. To either side of the longitudinal medial plane, the chassis engages through its stop 3 the corresponding spring 8 which is pivotally secured on the same side of said plane to the outer pivot 6 of the arm 4. The springs 8 operate thus as suspension means.

It will be readily understood that if the chassis rigid with the two pivotal axes 2 and with the stops 3, has a tendency to tilt toward the left-hand side, as seen in FIG. 1, the left-hand lever 4 sinks, while the right-hand lever 4 rises, both levers rocking round their ends 9 lying at a constant height above ground. The spring on which the left-hand stop rests, will consequently sink by a small amount on its left-hand side by reason of the rocking of the shorter lever arm 9—6, but it rises by a larger extent on the right-hand side as a consequence of the rocking of the longer lever arm 9—5.

The other spring on which the right-hand stop 3 rests, rises, on the contrary, slightly on the right-hand side, while it sinks to a greater extent to the left-hand side. Consequently, the left-hand stop 3 increases the bending of its spring 8, while the right-hand stop reduces the bending of the cooperating spring, which leads to an elastic braking of the tilting of the chassis towards the left-hand side.

It is thus apparent that the same springs 8 act as suspension and stabilizing springs. For sake of safety, I prefer using two groups of blade springs 8, so that, in case one of them breaks, the vehicle continues being suspended on both sides and is not subjected to a dangerous shifting of its balance.

The difference between the action of the right-hand and left-hand springs, that is the energy of braking obtained, depends on the position of the pivots 5 and 6 on the levers 4. It is preferable to select outer pivots 6 which are located further from the pivotal axis 2 than the inner pivots 5.

What I claim is:

1. In combination with a power-driven vehicle including a chassis and at least two axles, the provision of two transverse two-arm levers pivotally secured round parallel axes of the chassis, extending symmetrically to either side of the medial longitudinal plane of said chassis and the outer arms of which are pivotally carried by corresponding axle points, two blade springs extending transversely of the chassis and pivotally connected each with both levers, the spacing of the point of connection between one spring and one lever with reference to the pivotal axis of the latter being smaller than the spacing of the point of connection between said one spring and the other lever with reference to the pivotal axis of said other lever and the spacing of the point of connection between the other spring and said one lever with reference to the pivotal axis of the latter being larger than the spacing of the point of connection between said other spring and the other lever with reference to the pivotal axis of said other lever and two stops rigid with the chassis to either side of its medial longitudinal plane and adapted to engage each the upper surface of the spring connected with the pivotal point furthest from the medial plane on the lever pivotally secured to the same side of said plane as said stop.

2. In combination with a power-driven vehicle including a chassis and at least two axles, the provision of two transverse two-arm levers pivotally secured round parallel axes of the chassis to either side of a medial longitudinal plane and the outer arms of which are carried by corresponding axle points, two blade springs extending transversely of the chassis and pivotally connected with both levers at points which are located respectively on the inner arm of one lever and on the outer arm of the other lever for one spring and on the outer arm of said one lever and on the inner arm of said other lever for the other spring, and two stops rigid with the chassis to either side of its medial longitudinal plane and adapted to engage each the upper surface of the spring connected with the outer arm of the lever pivotally secured to the same side of said plane as said stop.

3. In combination with a power-driven vehicle including a chassis and at least two axles, the provision of two transverse two-arm levers pivotally secured round parallel axes of the chassis to either side of a medial longitudinal plane and the outer arms of which are carried by corresponding axle points, two blade springs extending transversely of the chassis and pivotally connected with both levers at points which are located respectively on the inner arm of one lever and on the outer arm of the other lever for one spring and on the outer arm of said one lever and on the inner arm of said other lever for the other spring, the pivotal axis of each lever on the chassis being further from the pivotal point on its outer arm than from the pivotal point on its inner arm and two stops rigid with the chassis to either side of its medial longitudinal plane and adapted to engage each the upper surface of the spring connected with the outer arm of the lever pivotally secured to the same side of said plane as said stop.

4. In combination with a power-driven vehicle including a chassis and at least two axles, the provision of two transverse two-arm levers pivotally secured round parallel axes of the chassis, extending symmetrically to either side of the medial longitudinal plane of said chassis and the outer arms of which are pivotally carried by corresponding axle points, two groups of blade springs extending transversely of the chassis and pivotally connected each with both levers, the spacing of the point of connection between one spring and one lever with reference to the pivotal axis of the latter being smaller than the spacing of the point of connection between said one spring and the other lever with reference to the pivotal axis of said other lever and the spacing of the point of connection between the other spring and said one lever with reference to the pivotal axis of the latter being larger than the spacing of the point of connection between said other spring and the other lever with reference to the pivotal axis of said other lever, and two stops rigid with the chassis to either side of its medial longitudinal plane and adapted to engage each the upper surface of the group of springs connected with the pivotal point furthest from the medial plane on the lever pivotally secured to the same side of said plane as said stop.

References Cited in the file of this patent
UNITED STATES PATENTS

| | | |
|---|---|---|
| 1,650,544 | Sizaire | Nov. 22, 1927 |
| 2,497,459 | Leighton | July 30, 1945 |